UNITED STATES PATENT OFFICE.

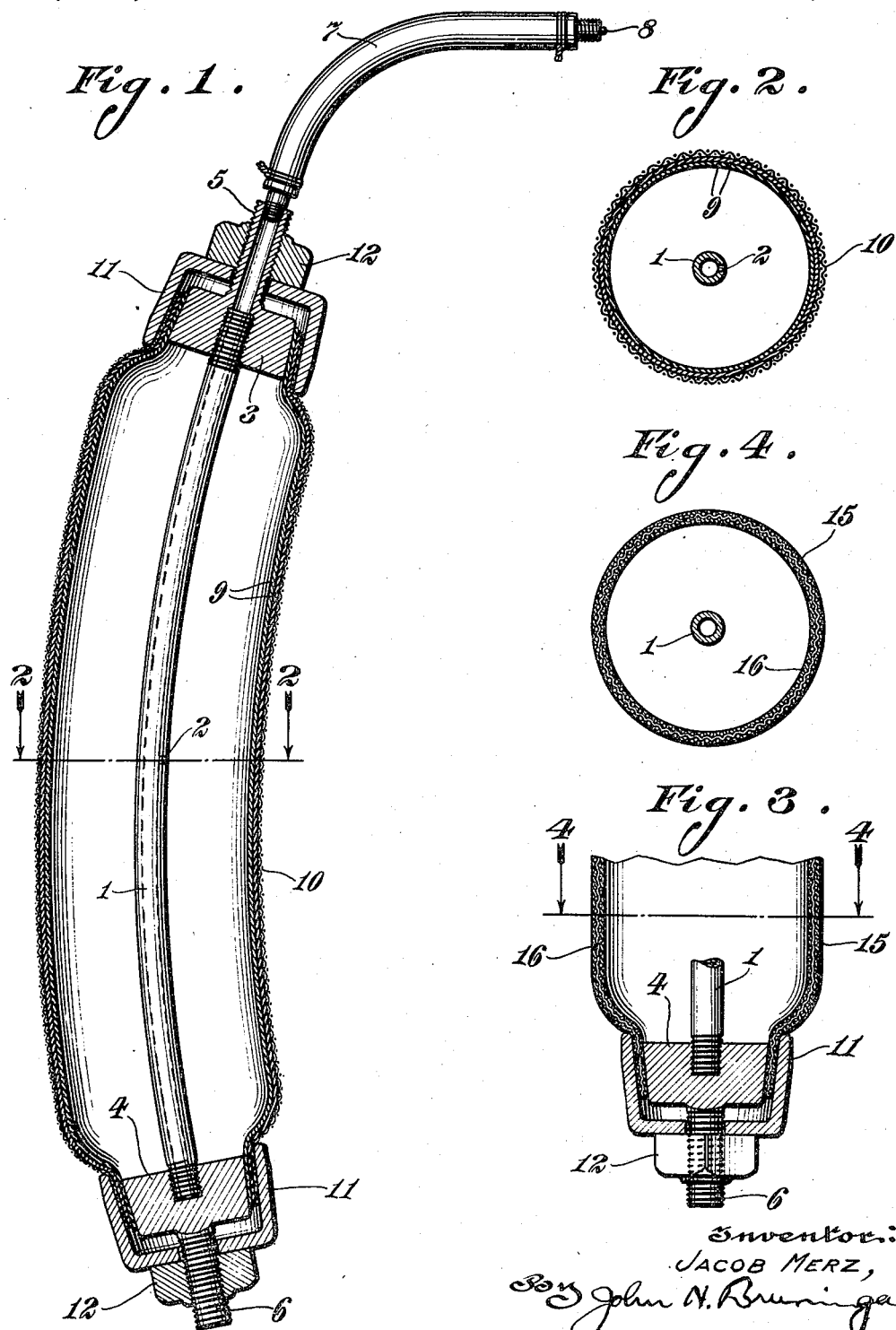

JACOB MERZ, OF CHICAGO, ILLINOIS.

DEVICE FOR REPAIRING PNEUMATIC TIRES.

1,414,091. Specification of Letters Patent. Patented Apr. 25, 1922.

Application filed January 4, 1919, Serial No. 269,708. Renewed February 4, 1922. Serial No. 534,276.

*To all whom it may concern:*

Be it known that I, JACOB MERZ, a citizen of the United States, and residing at Chicago, State of Illinois, have invented a certain new and useful Improvement in Devices for Repairing Pneumatic Tires, of which the following is a specification.

This invention relates to devices for repairing pneumatic tires.

In the repair of pneumatic tires, where it is necessary to vulcanize the same, it is the practice to place within the tire an inflatable air bag. Such an air bag should not only be simple in construction, but the bag itself must be replaceable when it becomes damaged or leaks. When in place, however, the joints between the ends of the bag and its support should be air tight so that the bag will remain inflated during the vulcanizing operation.

One of the objects of this invention, therefore, is to provide a device of this kind in which the air bag can be readily renewed and replaced, in which the joints between the air bag and its support will be air tight and which is simple in construction and operation.

Further objects will appear from the detail description taken in connection with the accompanying drawing, in which:

Figure 1 is a longitudinal section of the air bag embodying this invention;

Figure 2 is a section on the line 2—2, Figure 1;

Figure 3 is a detail, similar to Figure 1, but showing another embodiment of this invention; and Figure 4 is a section on the line 4—4, Figure 3.

Referring to the accompanying drawing, and more particularly to Figures 1 and 2, 1 designates a central support which is in tubular form and which is curved to conform approximately to the average circumferences of a tire in which the bag is to be used. This central support is provided with one or more apertures 2 and is preferably threaded at its ends to receive the rigid frusto-conical heads 3 and 4. The outer circumferential faces of these heads taper outwardly and each head is provided with a shank 5 or 6, the shank 5 on the head 3 being hollow to communicate with the tubular support 1. It forms, therefore, a nipple which is tapped internally at its end to receive a connection 7 whereby the device may be attached to a suitable source of air supply, the end of the connection being provided with the usual valve 8.

Mounted on the support and surrounding the same is the air bag. This air bag may consist of one or more layers 9 of rubber and an outer layer 10 of fabric. This bag is connected at its ends to the support and in order to make this connection, each shank 5 or 6 has mounted thereon and movable therealong, a clamping element in the form of a sleeve 11 whose inner face has a taper corresponding to the taper of the heads 3 and 4. The shanks 5 and 6 are further threaded to each receive a clamping member or nut 12, adapted to bear against the sleeve 11. Accordingly, this provides means for clamping the ends of the air bag on the support and between the heads thereon and the clamping elements. The operation of this device will, of course, be obvious as the air supplied through the connection 8 will enter the air bag through the apertures 2 and inflate the same so as to form a mandrel for the tire while it is being vulcanized or repaired. The valve 8, of course, prevents escape of the air.

In the embodiment shown in Figures 3 and 4, the air bag is formed of a portion of rubber 15 having a central layer of fabric 16 incorporated therewith and extending completely around the bag so as to form a strong but inflatable bag. This reinforced rubber bag may be used alone or it may be surrounded by a bag of canvas 10. It will be, of course, understood that the bag of canvas 10 may be a knit bag so that it can be distended when inflated to conform to various sizes of tires.

It will, therefore, be seen that the invention accomplishes its objects. The air bag is attached to its support in a simple and effective manner, enabling the air bag to be readily removed or replaced. Moreover, the joints are efficient and air tight and such as will not only enable the device to stand rough usage, but avoid all projections. The tapered construction in which the clamping elements move axially of the support, and the smooth, uninterrupted interior surface of the element 11, enable the bag to be clamped to the heads by a combined axial and rotative movement, so as to iron out all irregularities in the rubber and canvas in order to secure a permanent and air tight joint.

It is obvious that various changes may be made in the details of construction without departing from the spirit of this invention; it is, therefore, to be understood that this invention is not to be limited to the specific construction shown and described.

Having thus described the invention, what is claimed is:

1. A device for repairing pneumatic tires, employing a central support and an inflatable air bag surrounding the same, characterized by the feature that the end of the bag is clamped between a frusto conical rigid head on the support and an element tapered to cooperate with said tapered head to clamp the bag.

2. A device for repairing pneumatic tires, employing a central support and an inflatable air bag surrounding the same, characterized by means for attaching the air bag to the support, comprising, a frusto conical rigid head carrying a shank, and an element movable along said shank and adapted to cooperate with said head to clamp the end of the air bag therebetween.

3. A device for repairing pneumatic tires, employing a central support and an inflatable air bag surrounding the same, characterized by means for attaching the air bag to the support, comprising, a frusto conical rigid head carrying a shank, an element movable along said shank and adapted to cooperate with said head to clamp the end of the air bag therebetween, and a clamping member mounted on said shank and engaging said element.

4. A device for repairing pneumatic tires, employing a central support and an inflatable air bag surrounding the same, characterized by means for attaching the air bag to the support, comprising, a frusto conical rigid head having a shank, and an uninterrupted element movable along said shank and adapted to cooperate with said head to clamp the end of the air bag therebetween.

5. A vulcanizer air bag comprising the combination with a piece of rubber tubing, of a set of interior clamping members insertable in the end portions of said tubing, and having the general form of truncated cones, a set of cup-shaped caps having interior clamping surfaces conically tapered, the end portions of the tube being engaged between such surfaces and the conically tapered surfaces of the interior clamping member, and threaded clamping bolts extending through the caps along their respective axes one of said bolts being suitably apertured to allow the tube to be inflated.

In testimony whereof I affix my signature this 7th day of November, 1918.

JACOB MERZ.